United States Patent
Ebner et al.

(10) Patent No.: US 10,684,134 B2
(45) Date of Patent: Jun. 16, 2020

(54) USING PREDICTION MODELS FOR SCENE DIFFICULTY IN VEHICLE ROUTING

(71) Applicant: Waymo LLC, Mountain View, CA (US)

(72) Inventors: Dietmar Ebner, San Jose, CA (US); Joshua Seth Herbach, San Francisco, CA (US); Michael Steven Montemerlo, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 217 days.

(21) Appl. No.: 15/843,223

(22) Filed: Dec. 15, 2017

(65) Prior Publication Data

US 2019/0186936 A1   Jun. 20, 2019

(51) Int. Cl.
| | |
|---|---|
| *G01C 21/34* | (2006.01) |
| *G06N 10/00* | (2019.01) |
| *G05D 1/00* | (2006.01) |
| *G06N 20/00* | (2019.01) |

(52) U.S. Cl.
CPC ..... *G01C 21/3492* (2013.01); *G01C 21/3461* (2013.01); *G06N 20/00* (2019.01); *G05D 1/0088* (2013.01)

(58) Field of Classification Search
CPC ............ G01C 21/3492; G01C 21/3461; G06N 20/00; G05D 1/0088
See application file for complete search history.

(56) References Cited

U.S. PATENT DOCUMENTS

| | | | |
|---|---|---|---|
| 9,188,985 B1* | 11/2015 | Hobbs | G01C 21/34 |
| 9,557,183 B1* | 1/2017 | Ross | G08G 1/096816 |
| 2008/0059015 A1* | 3/2008 | Whittaker | G05D 1/0274 |
| | | | 701/23 |

(Continued)

FOREIGN PATENT DOCUMENTS

JP     2012083892 A     4/2012

OTHER PUBLICATIONS

International Search Report and Written Opinion for Application No. PCT/US2018/062446 dated Mar. 21, 2019.

*Primary Examiner* — Courtney D Heinle
(74) *Attorney, Agent, or Firm* — Botos Churchill IP Law

(57) ABSTRACT

A route is selected for travel by an autonomous vehicle based on at least a level of difficulty of traversing the driving environment along that route. Vehicle signals, provided by one or more autonomous vehicles, indicating a difficulty associated with traveling a portion of a route are collected and used to predict a most favorable driving route for a given time. The signals may indicate a probability of disengaging from autonomous driving mode, a probability of being stuck for an unduly long time, traffic density, etc. A difficulty score may be computed for each road segment of a route, and then the scores of all of the road segments of the route are added together. The scores are based on number of previous disengagements, previous requests for remote assistance, unprotected left or right turns, whether parts of the driving area are occluded, etc. The difficulty score is used to compute a cost for a particular route, which may be compared to costs computed for other possible routes. Based on such information, a route may be selected.

24 Claims, 11 Drawing Sheets

(56) References Cited

U.S. PATENT DOCUMENTS

| | | | |
|---|---|---|---|
| 2015/0345967 A1* | 12/2015 | Meuleau | G01C 21/3453 |
| | | | 701/25 |
| 2016/0025505 A1* | 1/2016 | Oh | G05D 1/0217 |
| | | | 701/23 |
| 2017/0010613 A1* | 1/2017 | Fukumoto | G08G 1/096827 |
| 2017/0192437 A1* | 7/2017 | Bier | G05D 1/0287 |

* cited by examiner

| Vehicle Signal ID | Signal Type | Timestamp | Location |
|---|---|---|---|
| 11xb2a | Manual control takeover | 05:12:2017::13:36:58 | 05_87_322 |
| 05dp4w | Request for remote assistance | 06:22:2017::05:23:32 | 48_23_102 |
| 47fgu1e | Extended wait | 02:19:2017::00:07:44 | 51_309_04 |
| 89fc3q | Unprotected turn | 04:01:2017::18:44:25 | 38_12_89 |
| 00lk5m | Occluded sensor view | 09:23:2017::19:25:49 | 43_155_53 |
| 62vb2s | Rapid brake application | 10:17:2017::08:57:12 | 37_64_202 |
| 59em6a | Limited sensor view | 09:30:2017::11:37:05 | 57_24_33 |
| 78ee4d | Unprotected lane crossing | 10:25:2017::15:09:39 | 39_88_297 |

FIGURE 6

| Segment | Route 810 | Route 820 | Route 830 |
|---|---|---|---|
| a | 1 | 1 | 1 |
| b | 1 | 1 | 1 |
| c | 9 | 5 | 5 |
| d | 1 | 5 | 1 |
| e | 1 | 5 | 1 |
| f | 5 | 1 | 1 |
| g | 1 | 0 | 1 |
| h | 1 | 0 | 0 |
| Total: | 20 | 18 | 11 |

FIGURE 11

USING PREDICTION MODELS FOR SCENE DIFFICULTY IN VEHICLE ROUTING

BACKGROUND

Current navigation systems consider factors such as distance and driving time. However, such systems provide only limited options to drivers and passengers of vehicles, and particularly autonomous vehicles. Such autonomous vehicles may operate in a fully autonomous mode where passengers may provide some initial input, such as a pickup or destination location, and the vehicle maneuvers itself to that location. In other instances the vehicles may operate in a semi-autonomous or manual mode, where a human driver controls some or all aspects of the vehicle maneuvering.

BRIEF SUMMARY

One aspect of the disclosure provides a method of determining a route of travel for an autonomous vehicle. This method includes receiving, at one or more computing devices, data from one or more vehicles, the data providing information regarding a road segment traversed by the one or more vehicles, and the data including one or more difficulty signals from the one or more vehicles. The data is used to determine a difficulty value for the segment, the difficulty value based on difficulty signals from the one or more vehicles indicating disengaging from autonomous mode to a manual mode. In other examples, the difficulty signals may indicate requesting assistance from a remote operator, a number of unprotected turns along the road segment, a portion of a driving area where a field of view of the autonomous vehicle is occluded, a threshold or abnormal number of obstacles, or the like. A route cost is computed for each of one or more possible routes between an origin and a destination, wherein the route cost is based on at least the difficulty values for the road segments along that route, and it is determined which of the one or more possible routes to travel based on the route cost for each of the one or more possible routes. In some examples, the method further includes causing the autonomous vehicle to drive the determined route. The difficulty signals may be correlated with temporal features. For example, computing the difficulty value for a particular segment may include comparing a day or time of expected travel along the particular segment with a day or time correlated with the difficulty signals for the particular segment. Determining the difficulty value may include determining a probability of encountering a difficulty corresponding to at least one of the difficulty signals.

In some examples, the method may further include computing a segment cost for the road segment, wherein the segment cost is computed based on the difficulty value, distance, and time required to traverse the road segment, wherein the route cost is computed based on the segment cost for the road segments along the route. In such examples, computing the segment cost may include computing a difficulty score based on the difficulty value for the segment, computing a distance score based on the distance of the segment, computing a time score based on the time required to traverse the segment, weighting the difficulty score, the distance score, and the time score, and computing the segment cost as a function of the weighted scores. Weighting the difficulty score, the distance score, and the time score may include setting coefficients for the difficulty score, the distance score, and the time score, wherein the coefficients are modifiable to adjust relative weights. Input may be received from a passenger of the autonomous vehicle, and the coefficients may be adjusted based on the received input from the passenger.

Another aspect of the disclosure provides a system for determining a route of travel for an autonomous vehicle. The system includes one or more memories, and one or more processors in communication with the one or more memories. The one or more processors may be configured to receive data from one or more vehicles, the data providing information regarding a road segment traversed by the one or more vehicles and including difficulty signals from the one or more vehicles, and determine, based on the data, a difficulty value for the segment, the difficulty value based on difficulty signals from the one or more vehicles indicating disengaging from autonomous mode to a manual mode. In some examples, the difficulty signal may alternatively or additionally indicate requesting assistance from a remote operator, a number of unprotected turns along the road segment, a portion of a driving area where a field of view of the autonomous vehicle is occluded, a number of obstacles on the road segment, etc. The one or more processors may further compute a route cost for each of one or more possible routes between an origin and a destination, wherein the route cost is based on at least the difficulty values for the road segments along that route, and determine, based on the route cost for each of the one or more possible routes, which of the one or more possible routes to travel.

BRIEF DESCRIPTION OF THE DRAWINGS

FIG. 6 is an example data structure in accordance with aspects of the disclosure.

FIG. 11 is an example computation of route costs for the possible route options of FIG. 8.

DETAILED DESCRIPTION

Overview

Figure 1:
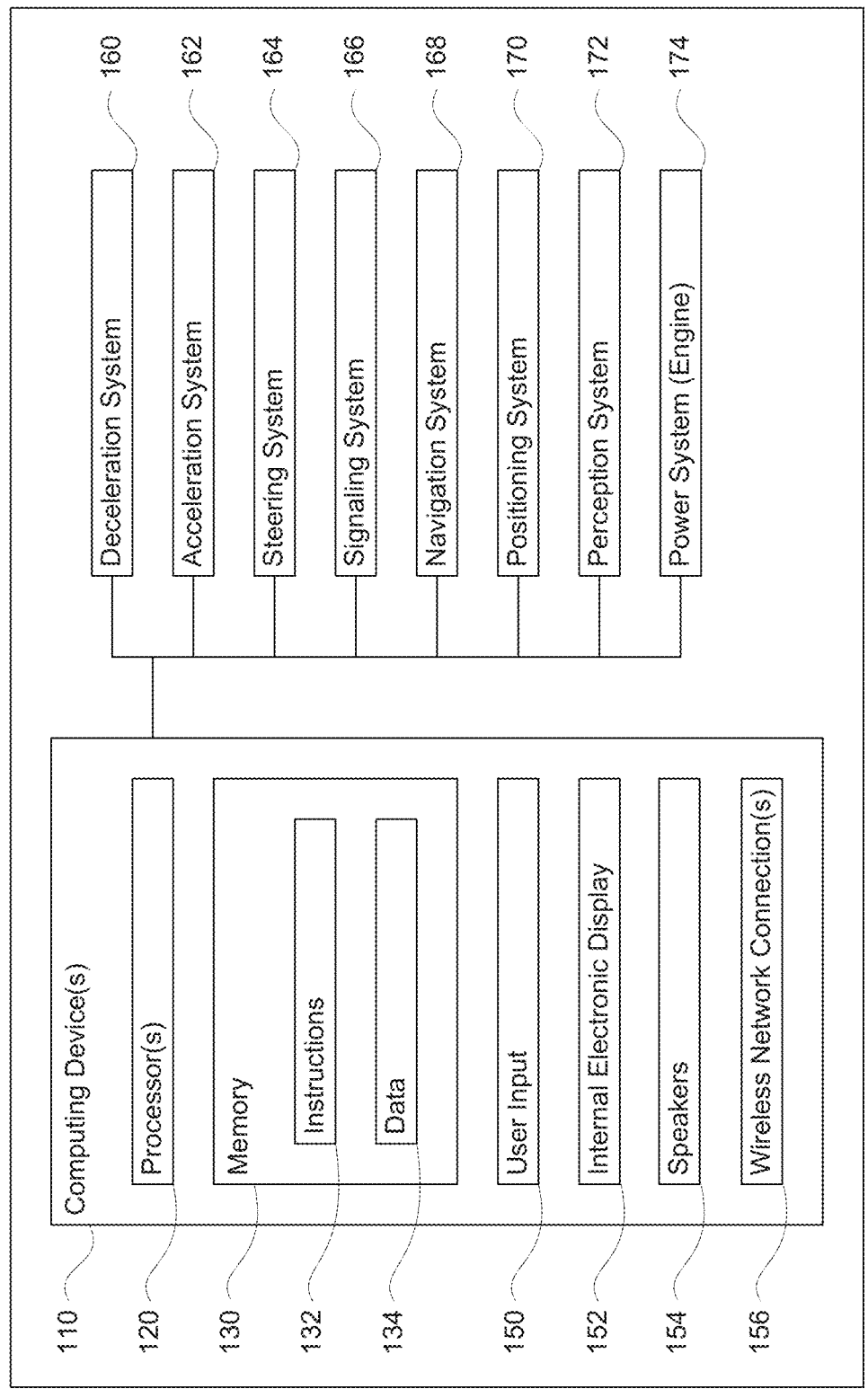
FIG. 1 is a functional diagram of an example vehicle in accordance with an exemplary embodiment.

The technology relates generally to using collected data to improve system behavior of an autonomous vehicle. In particular, such collected data can be included in a prediction model and used to determine a route to take based on time, distance, and difficulty of traveling the route.

Metrics are learned from a number of vehicles, which may include autonomous, semi-autonomous, and manually operated vehicles. These metrics are collected and considered in combination. Such metrics may include, for example, distance, time, and difficulty. The difficulty metric considers factors such as how difficult it was to make a particular turn, whether there are any obstacles such as construction, a number of pedestrian crossings, whether the roadway is rough, narrow, etc. The metrics are learned automatically from logs of previous trips, thus allowing the system to improve itself over time.

Such metrics may be associated with particular features, such as temporal features (e.g., hour of day, day of week), geographic features (e.g., precise location), and generalizing features (e.g., speed limit, nearby features such as crosswalks, intersections, schools). For example, while a particular turn may be difficult during a time corresponding to morning rush hour, the same turn may be less difficult in early afternoon and far less difficult late at night. By associating such features with the metrics, such features may be considered when determining an optimal route.

The difficulty metric may be determined based on signals indicating how difficult it is for a vehicle to traverse a particular road segment. Such signals may indicate a probability of disengaging from autonomous driving mode, a probability of being stuck for an unduly long time, traffic density, and the like. According to some examples, a difficulty score is computed for each road segment, and then the scores of all of the road segments of a route are added together. The scores may be based on number of previous disengagements, previous requests for assistance from a remote operator, unprotected left or right turns, whether parts of the driving area are occluded, user complaints, measured discomfort of passengers, fault responses in which the vehicle can no longer operate normally and need to pull over and stop, etc.

Scores may also be computed for each segment of a route based on an expected amount of time to complete travel along the segment, and a distance of the segment. These scores may be integrated with the difficulty score. For example, difficulty, time, and distance scores may all be used to compute a cost for the road segment. Such cost may be entered into a prediction model and used to determine the best route.

When determining the best route, dynamic weights can be used to adjust various trade-offs in routing, such as trade-offs between additional driving distance/time and easier driving conditions. Just as one example of a trade-off, a driver may be willing to drive some distance farther to avoid making a difficult left turn. The dynamic weights may be, for example, coefficients, which can be adjusted depending on the scenario. For example, in a first scenario where a customer is in the vehicle, the coefficients may be adjusted to be more conservative, such as providing for an easier though possible longer route. On the other hand, in a second scenario where a test driver is in the vehicle, the coefficients may be adjusted to be more adventurous, such as providing for a quicker and more difficult route.

Using the above-described model, travel routes may be selected based on not only time and distance, but also difficulty. Because this difficulty information is collected from a number of vehicle logs, it is accurate and also does not place a burden on a user for input.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may capable of communicating with various components of the vehicle in order to control the movement of vehicle 100 according to primary vehicle control code of memory 130. For example, returning to FIG. 1, computing devices 110 may be in communication with various systems of vehicle 100, such as deceleration system 160, acceleration system 162, steering system 164, signaling system 166, navigation system 168, positioning system 170, perception system 172, and power system 174 (i.e. the vehicle's engine or motor) in order to control the movement, speed, etc. of vehicle 100 in accordance with the instructions 134 of memory 130. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or data 132 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2:
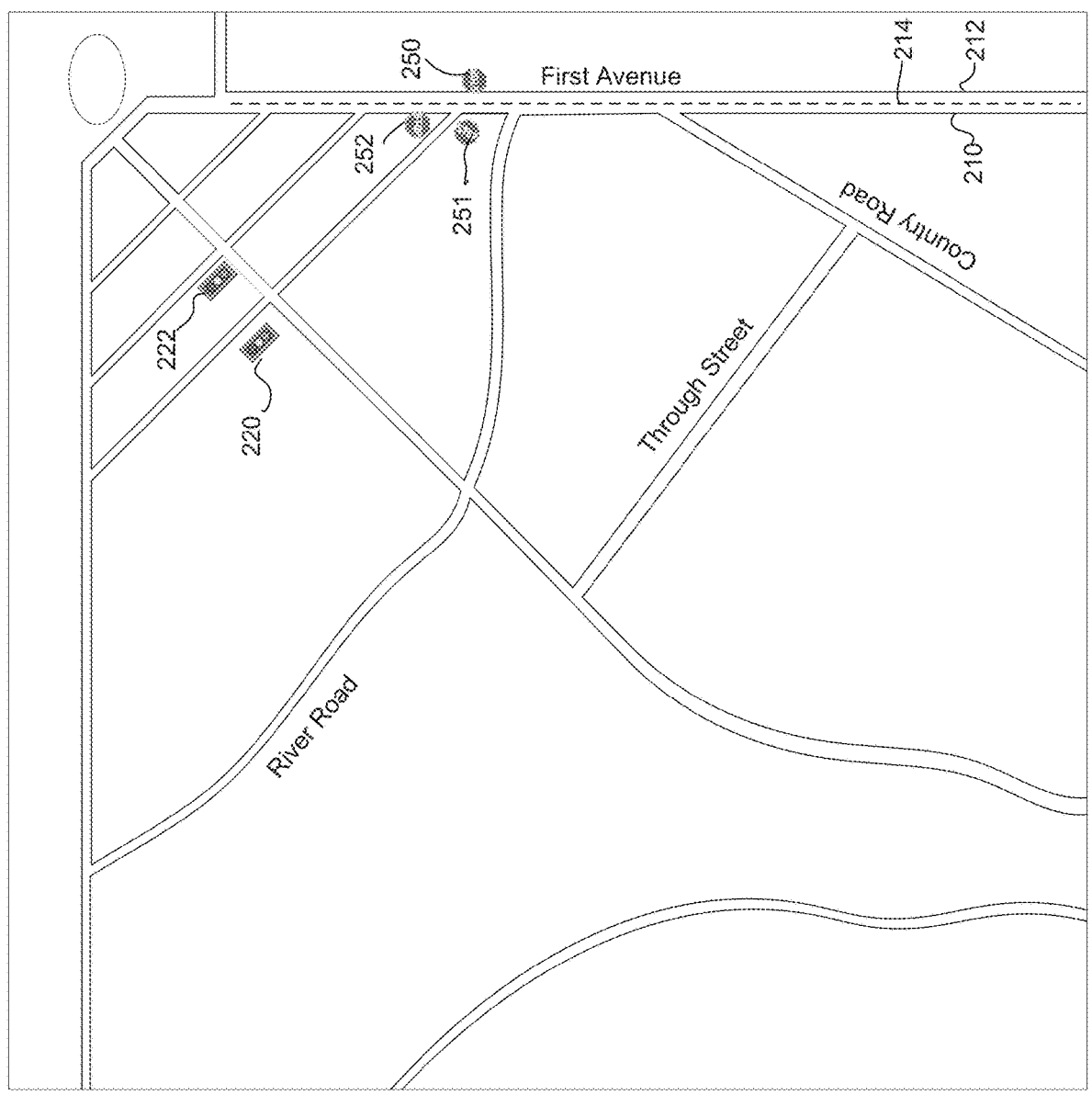
FIG. 2 is an example of map information in accordance with aspects of the disclosure.

FIG. 2 is an example of map information 200 for a geographic area, which includes a plurality of roadways. The map information 200 may include information identifying the shape, location, and other characteristics of features such as lane lines 210, 212, 214, traffic signal lights 220, 222, stop signs 250, 251, 252, and other features not shown, such as crosswalks, sidewalks, and yield signs 260. The map information 200 may further include distance information for each of the plurality of roadways, and regulations for the various roadways, such as speed limits, prohibition of maneuvers, or the like. Just as one example of a prohibited maneuver, vehicles may be prevented from turning right on a red light between 8 am-4 pm weekdays. According to some examples, the map information may also include traffic information, such as historical traffic information. Such traffic information may be stored in association with temporal limitations, for example, indicating times of days/weeks when traffic is heavier.

Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization systems may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 3:
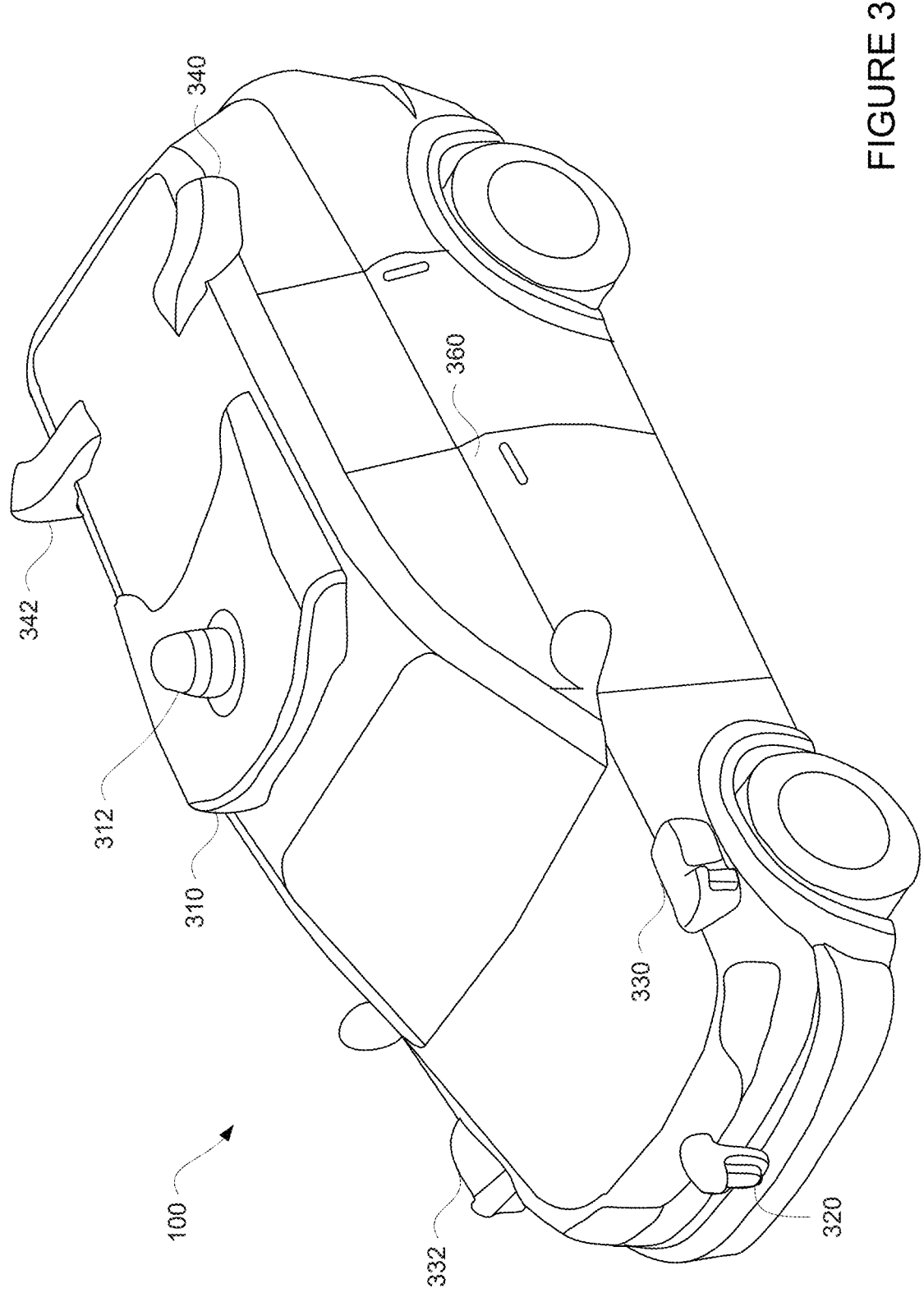
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a lidar sensor as well as various cameras and radar units. In addition, housing 320 located at the front end of vehicle 100 and housings 330, 332 on the driver's and passenger's sides of the vehicle may each store a lidar sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may control the direction and speed of the vehicle by controlling various components. By way of example, computing devices 110 may navigate the vehicle to a destination location completely autonomously using data from the detailed map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
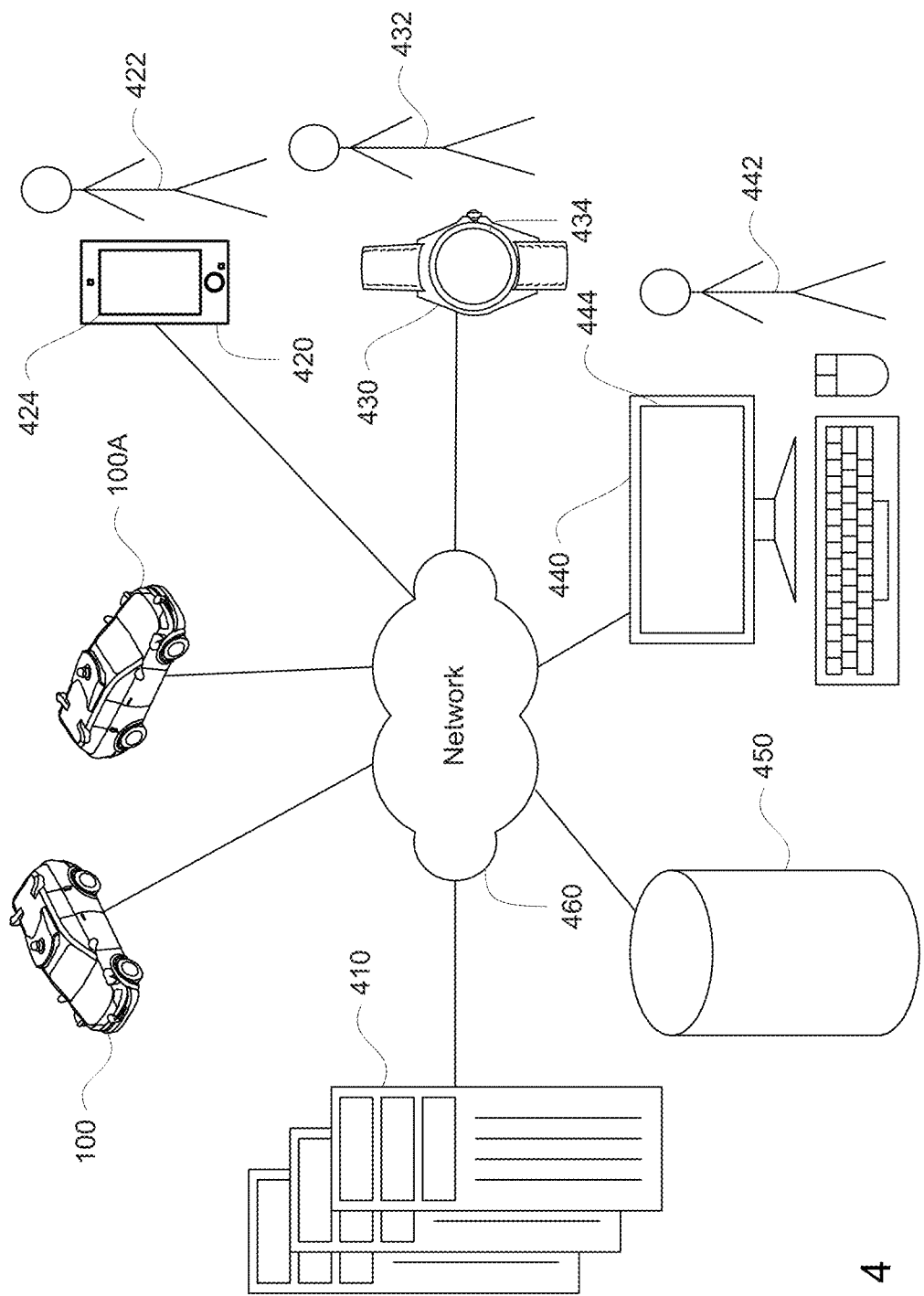
FIG. 4 is a pictorial diagram of an example system in accordance with an exemplary embodiment.
Figure 5:
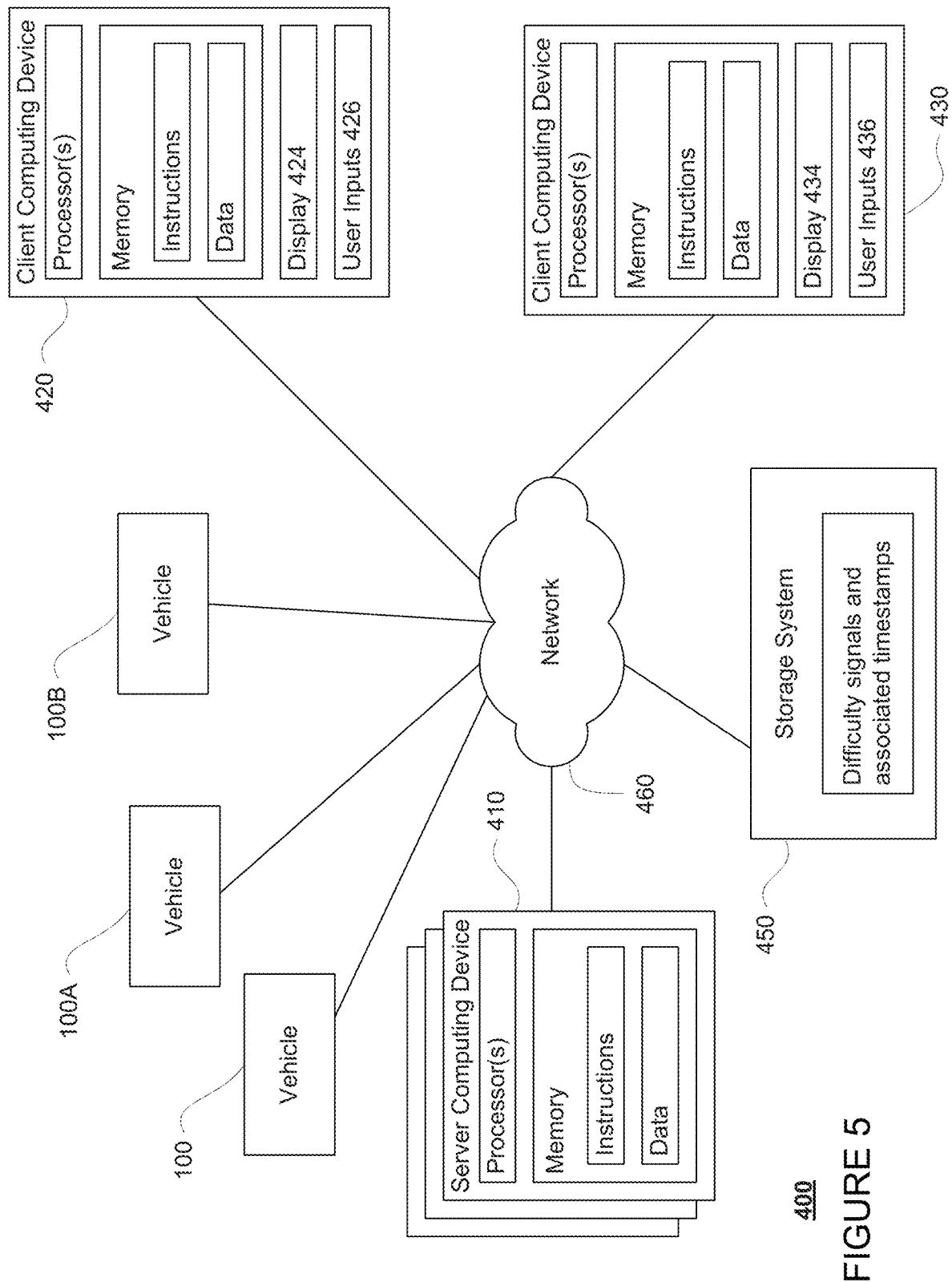
FIG. 5 is a functional diagram of the system of FIG. 4 in accordance with aspects of the disclosure.

Computing device 110 of vehicle 100 may also receive or transfer information to and from other computing devices, such as to other vehicles, control centers, databases, user devices, etc. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A, 100B as well as computing devices 420, 430, 440 via the network 460. For example, vehicles 100, 100A, 100B may be a part of a fleet of vehicles that can be dispatched by server computing devices to various locations. In this regard, the server computing devices 410 may function as a dispatching system. In addition, the vehicles of the fleet may periodically send the server computing devices location information provided by the vehicle's respective positioning systems as well as other information relating to the status of the vehicles discussed further below, and the one or more server computing devices may track the locations and status of each of the vehicles of the fleet.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, etc.

Storage system 450 may store various types of information as described in more detail below. This information may be retrieved or otherwise accessed by a server computing device, such as one or more server computing devices 410, in order to perform some or all of the features described herein. As an example, the information of storage system 450 may include reports from other vehicles regarding difficulties encountered during previous drives. Such difficulties may include, for example, obstructed sensors views, obstructed roadways, unprotected turns, rough terrain, a need for a human driver to take over control of the vehicle, requests for assistance, or any other difficulties. The reports of such difficulties may be stored in association with metadata which identifies what the particular difficulty was and a time the difficulty occurred. In some examples, the reports may further be stored in association with a value indicating a level of severity of the difficulty.

FIG. 6 provides just one example of the type and arrangement of information that may be stored in the storage system 450. As shown, chart 600 includes a number of columns listing vehicle signal identifiers 610, signal type 620, timestamps 630, and location 640. It should be understood that additional information may also be listed, and that some of the columns may be omitted. Just as one example, the chart 600 may also store an associated difficulty value, for each signal, indicating a level of difficulty imposed by the driving environment. It should further be understood that the columns and rows are the chart 600 may be sorted in any order, or that a different organizational structure may be used altogether.

In the example chart 600, the vehicle signal identifier 610 may identify a specific signal sent by a vehicle. Each unique signal may have a unique identifier. This identifier may be used to distinguish particular signals and to facilitate identification of particular information. The signal identifier may be included with the signal sent by the vehicle, assigned by the server computing device 410, or composed from some combination of information from the vehicle, the serer 410, or other sources. The signals in the chart 600 may be from one vehicle or from a plurality of different vehicles.

The signal type 620 indicates a type of difficulty encountered by the vehicle when sending the signal. A few example types of difficulties are listed in the chart 600, including a need for a human driver to takeover control of the vehicle manually, a request for assistance from a remote operator, an extended wait (e.g., to make a turn or other maneuver), an unprotected turn, an occluded sensor view, a rapid brake application, a limited sensor view, and an unprotected lane crossing. Further examples include user complaints, measured discomfort of passengers, fault responses, etc. Other types of signals indicating a driving difficulty resulting from a driving environment may also be stored, and multiple signals of the same type may be stored.

The timestamps 630 may indicate a time the signal was sent by the vehicle. This information may be particularly useful for difficulties that are time dependent. For example, it may be determined from the signals that extended wait times to make a turn at a particular location are only experienced between 2 pm-4 pm on school days. As another example, a sensor view may only be occluded during spring and summer months, before foliage drops from a tree occluding the view. Such temporal patterns may be recognized using machine learning techniques. The timestamps 630 may also be used to update the information. For example, signals older than a predetermined threshold, such as several months or days, may be deleted or may be attributed a lower weight when determining an associated level of difficulty. While the timestamp information as shown in indicated by month:day:year:hour:minute:second, it should be understood that any other convention for indicating time may be used.

The location information 640 may identify a location from which the signal was transmitted. In the example shown, the location information is indicated by a regional identifier, a street identifier, and a segment identifier, also other formats may be used. The regional identifier may include a value indicating a particular city, state, country, or other region. The street identifier may include a value or other indicia corresponding to a particular roadway which is divided into segments for purposes of analysis. Accordingly, the segment identifier indicates a particular segment of the street. It should be understood that the location format used in chart 600 is merely an example, and that any of a variety of other formats may be used, such as geographic coordinates (e.g., latitude, longitude, altitude) or other descriptors.

In some examples, the storage system 450 may also store other information relating to difficulty of traversing a driving environment, such as a model based on the information regarding the difficulty signals. For example, the model may be a prediction model identifying which road segments are likely to present difficulty, such as requiring transition from autonomous mode to manual mode, at a given time.

The storage system 450 may also store information which can be provided to client computing devices for display to a user. For instance, the storage system 450 may store predetermined distance information for determining an area at which a vehicle is likely to stop for a given pickup or destination location. The storage system 450 may also store graphics, icons, and other items which may be displayed to a user.

The vehicle 100 may use the information from the storage system 450 to determine a route for the vehicle 100 to travel. For example, given a point of origin and a destination, several different routes may be available to the vehicle 100. However, some routes may be more difficult to travel than others. The information regarding difficulty of traversing the driving environments stored in the storage system 450 may be used to determine which route will present the least amount of difficulty the given time. In some examples, such difficulty information may be considered in combination with other travel information, such as time, distance, tolls, etc. The time information may take into account traffic, speed limits, and other information affecting driving time. According to some examples, the difficulty information and other travel information may be weighted. For example, a preference for easier travel despite longer travel time may be accommodated by adjusting weights accorded to difficulty information and time information, respectively. A preference for a shortest distance despite potentially difficult conditions may be accommodated by adjusting the weights accorded to distance and difficulty, respectively.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 7:
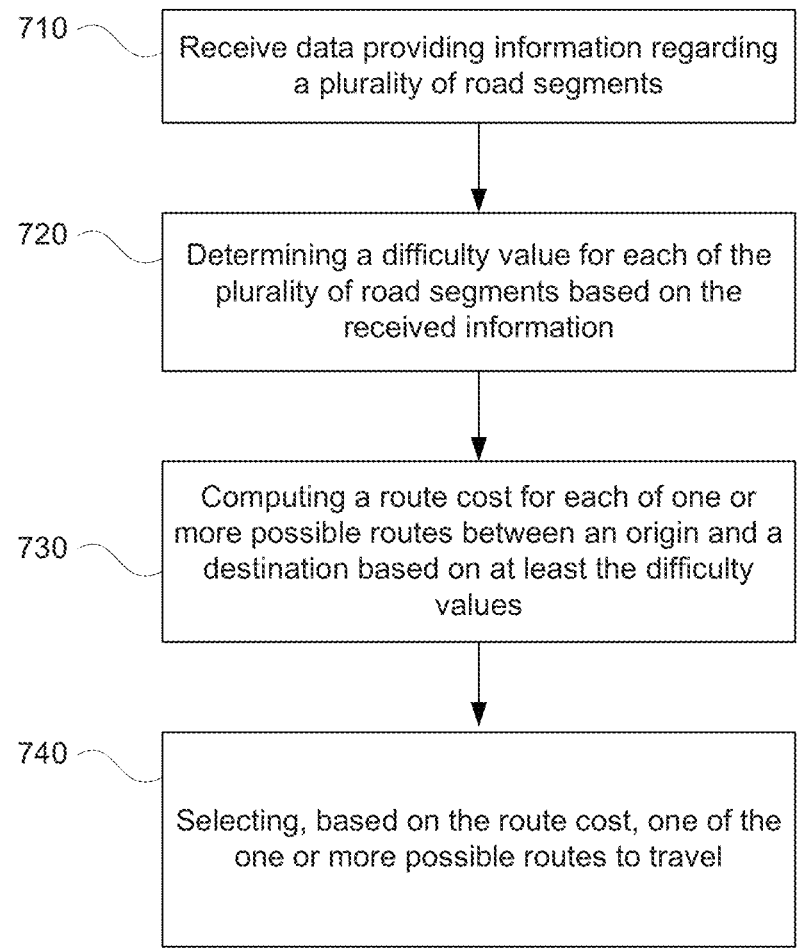
FIG. 7 is an example flow diagram in accordance with aspects of the disclosure.

FIG. 7 presents a flow diagram 700 illustrating an example method of selecting a route based on difficulty of driving environment. In block 710, data is received, the data providing information regarding a plurality of road segments. The information may include signals from one or more vehicles that have traversed the road segments, such as the signals discussed above in connection with FIG. 6. The signals may indicate a difficulty associated with traversing the road segment, wherein such difficulty is a result of the driving environment. Examples of such difficulties include requiring manual takeover, requesting assistance from remote operators, unprotected maneuvers, limited/occluded/obstructed view, or the like. In some examples, the difficulties may be signaled by user complaints, measured passenger discomfort, fault responses in which the vehicle can no longer operate normally and needs to pull over and stop, etc. Passenger discomfort may be measured by, for example, survey responses, changes in passenger heart rate, temperature, or other vitals, changes in the passenger's seating position, adjustment of controls, etc.

In block 720, a difficulty value is determined for each of the plurality of road segments based on the received information. For example, the difficulty value may be a score or other value which may be used to compare a level of difficulty associated with traversing a first road segment to a level of difficulty of traversing a second road segment. For example, each different type of difficulty indicated by the vehicle signals may have a value. In some instances, the value for one type of difficulty may be higher than the value of another type. For example, the difficulty value associated with a request for assistance from a remote operator may be different than a difficulty value associated with an unprotected turn. In other examples, the difficulty values may be varied based on other information, such that the values for two signals having a same type are different. These difficulty values may be used to compute a difficulty value for the road segment. For example, the difficulty values of the various signals may be factored into a predictive model, which predicts a difficulty that will be encountered on a road segment if traveled. Such prediction may be time correlated, such that the predicted difficulty level may vary for a particular road segment depending on a time of day, week, season, or other temporal information. For a particular route segment, multiple difficulties may be predicted to occur at a particular time of travel. Accordingly, the difficulty value may be computed as a function of the multiple predicted difficulties.

In block 730, a route cost for each of one or more possible routes between an origin and a destination is computed based on the difficulty values associated with the plurality of road segments. For example, the route cost may be a total of the difficulty values for each road segment along the route. In some examples, the route cost may also factor in other travel variables, such as time, distance, traffic, etc.

In block 740, a route of travel for the autonomous vehicle is selected based on the computed route costs. Accordingly, a control system of the autonomous vehicle may cause the vehicle to travel the selected route.

Figure 8:
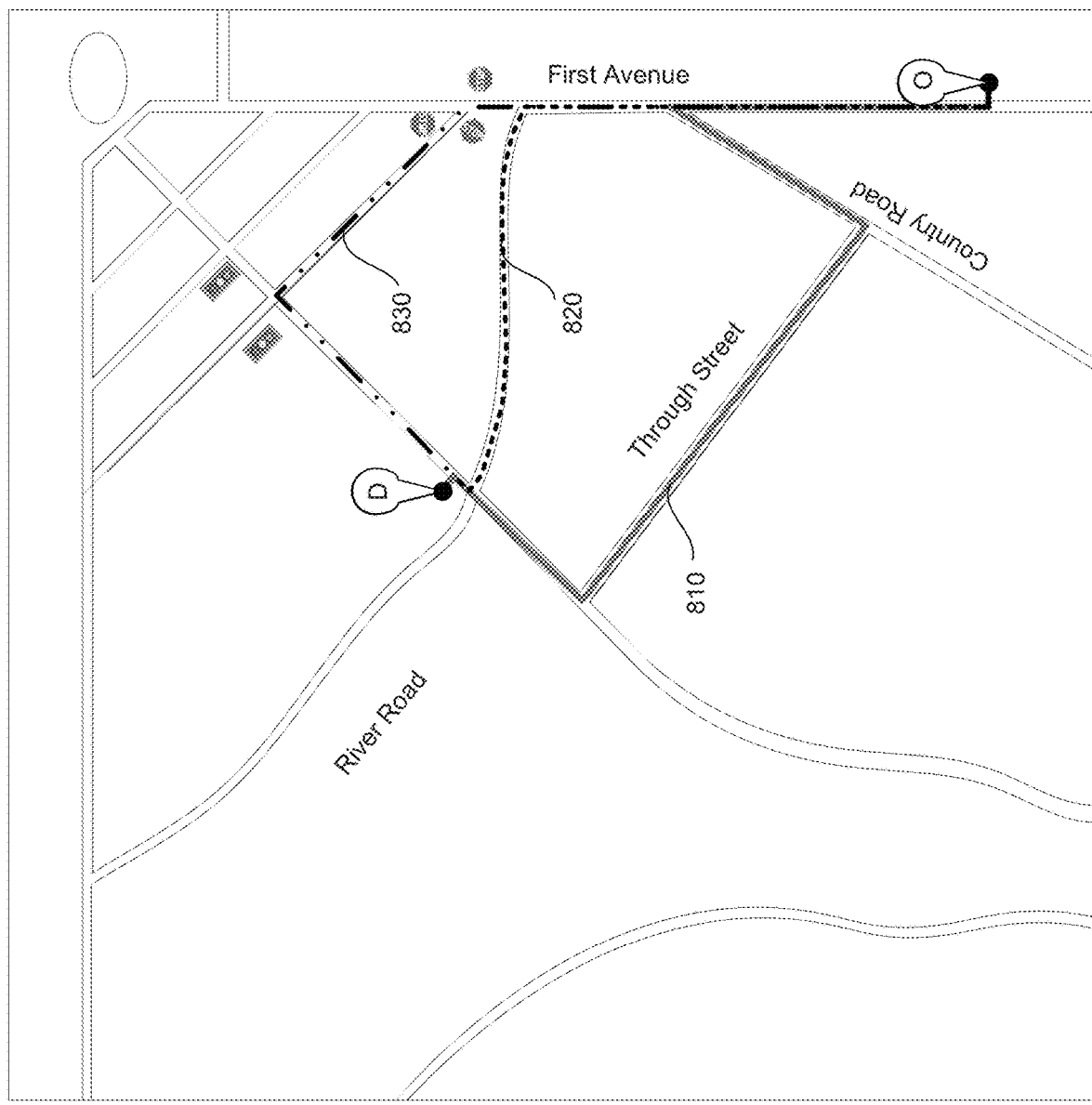
FIG. 8 is an example of possible route options associated with the map information of FIG. 2.

FIG. 8 illustrates an example of multiple possible routes 810, 820, 830 between an origin O and a destination D. The routes 810-830 are shown relative to map information, such as the map information 200 of FIG. 2.

Figure 9:
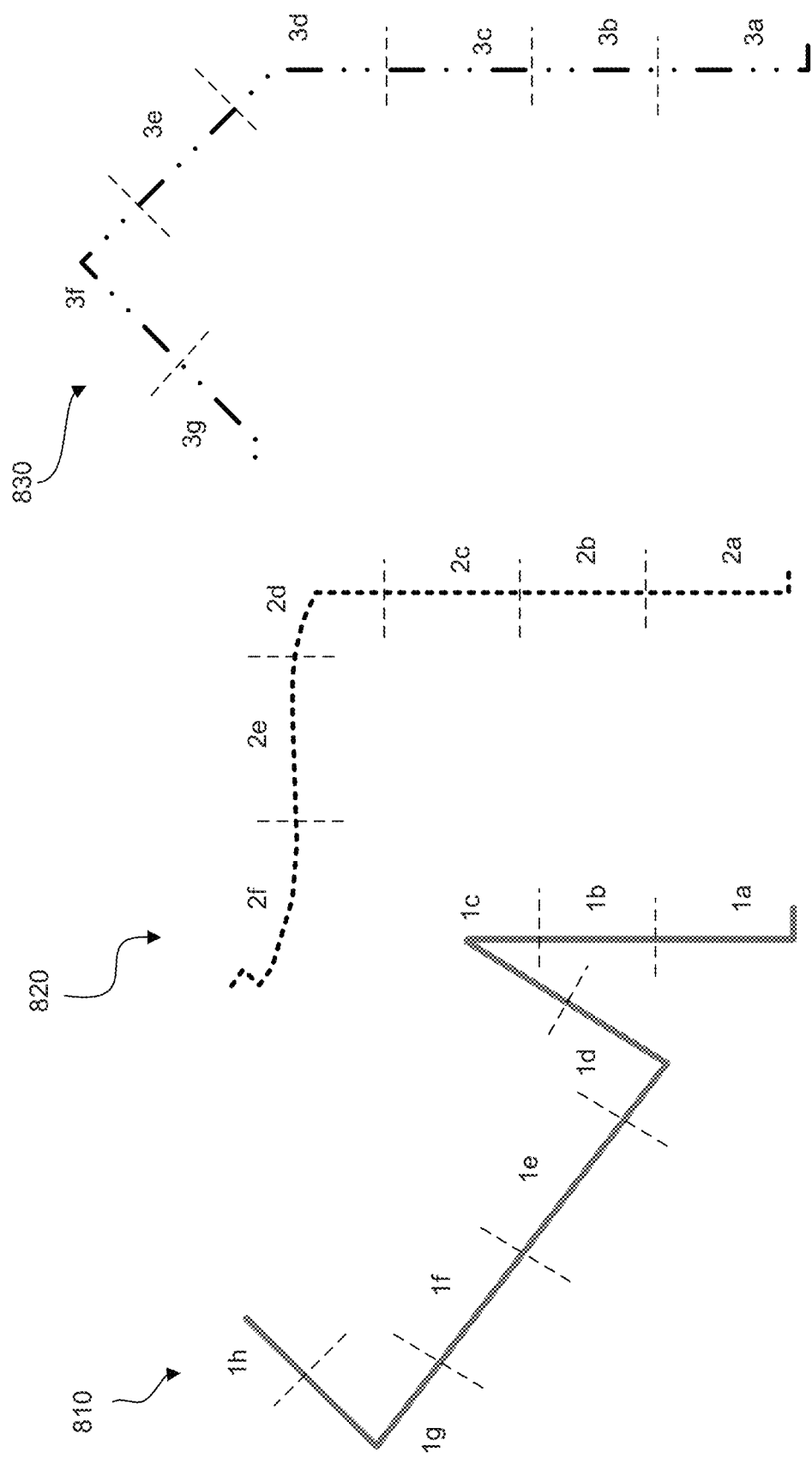
FIG. 9 is an example of road segments for the possible route options of FIG. 8.

FIG. 9 illustrates the routes 810, 820, 830, wherein each route includes a plurality of road segments. For example, a first route 810 includes segments 1a-1h, second route 820 includes segments 2a-2f, and third route 830 includes segments 3a-3g. The road segments may be defined for each roadway indicated on a map, or only for each possible route between an origin and a destination. The road segments may divide the roadway or route into any number of discrete subportions for analysis. For example, additional smaller segments may be used for analysis with finer granularity of potential difficulties, while fewer larger segments may be used for faster analysis consuming less memory and computing resources. In some examples, the road segments may different in size from one segment to the next. The road segments may be designated based on any factors, such as absolute distance, distance between turns, estimated travel time, etc.

Figure 10:
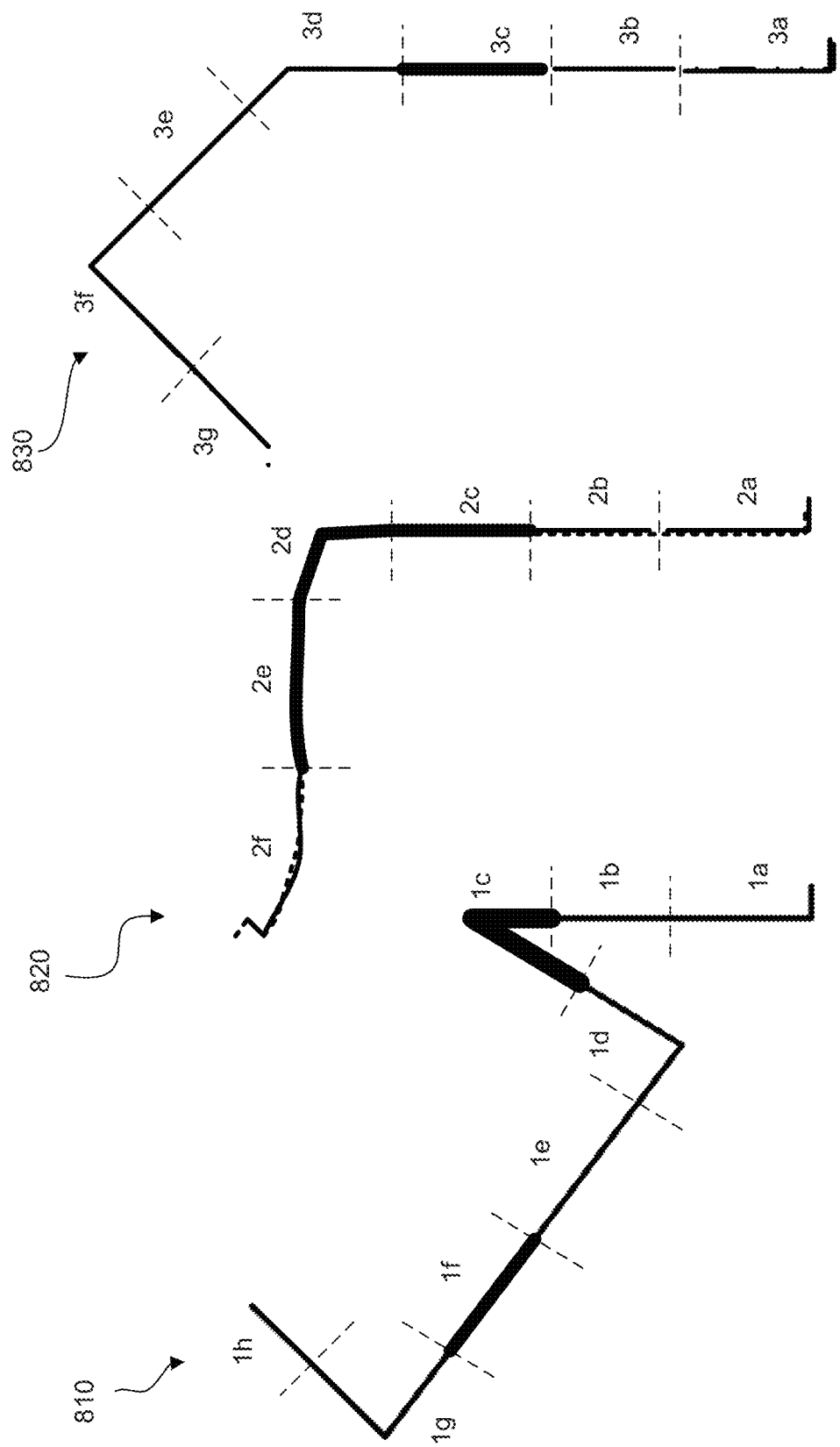
FIG. 10 is an example representation of difficulty levels associated with the road segments of FIG. 9.

FIG. 10 illustrates the possible routes 810-830 showing relative difficulty of each road segment. In this example, increased difficulty is represented by increased line thickness. Along route 810, segments 1a and 1b have relatively low difficulty, while segment 1c has a very high associated level of difficulty. This may be attributed to the difficulty of maneuvering the vehicle to make such a sharp left-hand turn. Other factors may include visibility while making the turn and whether the turn is unprotected. For example, if other vehicles traveling along the roadway onto which the vehicle is turning do not have to stop or yield while the vehicle is making the sharp left-hand turn, the turn has increased difficulty. In the example shown, other difficult segments of route 810 include segment 1f. This may be attributed to factors other than turning, such as high pedestrian traffic, a rough terrain, limited visibility, or the like.

Along route 820, segments 2a and 2b are also shown to have low relative difficulty. Because these segments corresponds to the same portions of roadway as the segments 1a and 1b of route 810, it would be expected that they have the same difficulty level. Segments 2c-2e, however, have a high level of associated difficulty, though still lower than that of segment 1c. Such difficulty may be a result of having to maneuver around vehicles attempting to make the turn of segment 1c, waiting to make the unprotected left turn of segment 2d, or any of a plurality of other possibilities. The difficulty of segment 2e may be a result of other driving conditions, such as an obstructed view (e.g., from buildings, signs, foliage, parked cars, or any other objects), roadway construction, etc.

Along route 830, only segment 3c is shown as having a level of associated difficulty. This difficulty level corresponds to that of segment 2c, and is likely a result of the same driving conditions. While segment 3d includes a left-hand turn, such turn may have a low level of associated difficulty because it is a protected turn in that vehicles traveling in opposing directions will stop pursuant to the stop signs 251, 252.

FIG. 11 illustrates an example calculation of route cost for each of possible routes 810, 820, 830. For each route segment, a difficulty value attributed to that segment is listed. While in the example of FIG. 10 the difficulty was indicated graphically, in FIG. 11 it is represented by a numerical value. It should be understood, however, that any convention for indicating the difficulty level may be used. Consistent with FIG. 10, segment 1c of the route 10 is indicated to have a highest associated difficulty level. Other segments of relatively increased difficulty includes segment 1f of route 810, segments 2c-2e of route 820, and segment 3c of route 830. Because routes 820 do not have a segment corresponding to h, those values are set to 0. The values for each segment along the routes may be summed to derive a total difficulty value for the route. For example, route 810—has a total difficulty value of 20, route 820 has a total difficulty value of 18, and route 830 has a total difficulty value of 11. Accordingly, if solely considering difficulty, route 830 may be the most desirable route with a lowest route cost of 11. However, as mentioned above, in some examples other factors may be considered in computing route cost, such as distance, time, etc.

The foregoing examples describe an advantageous method of determining a travel route, because it expands traditional consideration of factors such as time and distance to further consider driving/riding experience. Passengers of autonomous vehicle may thus have an option of selecting a smoother or less risky drive, despite that it may take longer than other routes. This may be particularly preferable for passengers that want to read, work, or relax during the trip.

While a number of examples of different types of difficulty that may be encountered by a vehicle are described above, it should be understood that any number of further types of difficulty may also be factored into a route cost computation. For example, on particular streets, garbage collection may occur at predetermined times, such as between 7 am-8 am every Tuesday and Friday. During garbage collection times, the slow moving and frequently stopping garbage truck may present an obstacle for a vehicle traveling on that street. Moreover, presence of sanitation workers collecting the garbage requires additional caution in operation of the vehicle traveling on that street. Accordingly, difficulty signals from previous or historic drives along that street may indicate a number of obstacles (e.g., garbage truck, garbage cans, sanitation workers, etc.) above a predetermined threshold. The difficulty signals may also indicate slower driving times, increased wait times, an increased number of applications of a braking system, unexpected maneuvers (e.g., swerving), etc. Any or all of these difficulty signals may be used in computation of a cost for the particular street during the predetermined garbage collection times.

Just by way of further example, a given roadway may be near a school. As such, during school hours, and particularly during times of arrival at and dismissal from the school, an increased amount of pedestrians may be walking on or crossing the given roadway. Accordingly, during those school hours, an increased number of obstacles may be presented, requiring additional caution by vehicles traveling on the given roadway. The difficulty signals from previous vehicles having traveled the given road may indicate the presence of such additional obstacles during times corresponding to school hours. Such additional obstacles may have in some cases resulted in disengagement or a request to a remote operator for assistance. These difficulty signals indicating the presence of such additional obstacles during the particular times on the given roadway may also be used to compute a cost for the traveling the given roadway.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of determining a route of travel for an autonomous vehicle, the method comprising:
   retrieving, at one or more computing devices, data from a storage system via a network, the data providing information regarding road segments traversed by a plurality of vehicles other than the autonomous vehicle, the data including a plurality of difficulty signals that indicate previous disengagements by one or more of the plurality of vehicles from an autonomous mode to a manual mode, wherein the storage system and the network are external to the autonomous vehicle;
   determining, based on the data, a difficulty value for each road the segment based on the difficulty signals;
   computing, with the one or more computing devices, a route cost for each of one or more possible routes between an origin and a destination, wherein the route cost is based on at least the difficulty values for the road segments along that route;
   determining, based on the route cost for each of the one or more possible routes, which route of the one or more possible routes to travel; and
   generating a routing signal based on the determined route.

2. The method of claim 1, wherein the route cost is further based on difficulty signals indicating a number of unprotected turns of the road segments along the determined route.

3. The method of claim 1, further comprising correlating the difficulty signals with temporal features.

4. The method of claim 3, wherein computing the difficulty value for a particular segment comprises comparing a day or time of expected travel along the particular segment with a day or time correlated with the difficulty signals for the particular segment.

5. The method of claim 1, wherein determining the difficulty value comprises determining a probability of encountering a difficulty corresponding to at least one of the difficulty signals.

6. The method of claim 1, further comprising entering the difficulty values into a prediction model.

7. The method of claim 1, further comprising:
   computing a segment cost for each road segment, wherein the segment cost is computed based on the difficulty value, distance, and time required to traverse each road segment;
   wherein the route cost is computed based on the segment cost for the road segments along the route.

8. The method of claim 7, wherein computing the segment cost comprises:
   computing a difficulty score based on the difficulty value for each road segment;
   computing a distance score based on the distance of each road segment;
   computing a time score based on the time required to traverse each road segment;
   weighting the difficulty score, the distance score, and the time score; and
   computing the segment cost as a function of the weighted scores.

9. The method of claim 8, wherein weighting the difficulty score, the distance score, and the time score comprises setting coefficients for the difficulty score, the distance score, and the time score, wherein the coefficients are modifiable to adjust relative weights.

10. The method of claim 9, further comprising:
    receiving input from a passenger of the autonomous vehicle; and
    adjusting the coefficients based on the received input from the passenger.

11. The method of claim 1, wherein the difficulty value is further based on the difficulty signals indicating at least one of: requesting remote driving assistance, a number of unprotected turns along each road segment, a portion of a driving area where a field of view of the autonomous vehicle is occluded, or a number of obstacles along each road segment.

12. The method of claim 1, further comprising:
    causing the autonomous vehicle to drive according to the determined route based on the routing signal.

13. A system for determining a route of travel for an autonomous vehicle, comprising:
a network;
a storage system; and
one or more processors configured to:
retrieve data from the storage system via the network, the data providing information regarding road segments traversed by a plurality of vehicles other than the autonomous vehicle at different times, the data including a plurality of difficulty signals that indicate previous disengagements by one or more of the plurality of vehicles from an autonomous mode to a manual mode, wherein the storage system and the network are external to the autonomous vehicle;
determine, based on the data, a difficulty value for each road segment based on the difficulty signals;
compute a route cost for each of one or more possible routes between an origin and a destination, wherein the route cost is based on at least the difficulty values for the road segments along that route;
determine, based on the route cost for each of the one or more possible routes, which route of the one or more possible routes to travel; and
generate a routing signal based on the determined route.

14. The system of claim 13, wherein the route cost is further based on difficulty signals indicating a number of unprotected turns of the road segments along the determined route.

15. The system of claim 13, wherein the one or more processors are further configured to correlate the difficulty signals with temporal features.

16. The system of claim 15, wherein computing the difficulty value for a particular segment comprises comparing a day or time of expected travel along the particular segment with a day or time correlated with the difficulty signals for the particular segment.

17. The system of claim 13, wherein determining the difficulty value comprises determining a probability of encountering a difficulty corresponding to at least one of the difficulty signals.

18. The system of claim 13, wherein the one or more processors are further configured to enter the difficulty values into a prediction model.

19. The system of claim 13, wherein the one or more processors are further configured to:
compute a segment cost for each road segment, wherein the segment cost is computed based on the difficulty value, distance, and time required to traverse each road segment;
wherein the route cost is computed based on the segment cost for the road segments along the route.

20. The system of claim 19, wherein computing the segment cost comprises:
computing a difficulty score based on the difficulty value for each road segment;
computing a distance score based on the distance of each road segment;
computing a time score based on the time required to traverse each road segment;
weighting the difficulty score, the distance score, and the time score; and
computing the segment cost as a function of the weighted scores.

21. The system of claim 20, wherein weighting the difficulty score, the distance score, and the time score comprises setting coefficients for the difficulty score, the distance score, and the time score, wherein the coefficients are modifiable to adjust relative weights.

22. The system of claim 21, wherein the one or more processors are further configured to:
receive input from a passenger of the autonomous vehicle; and
adjust the coefficients based on the received input from the passenger.

23. The system of claim 13, wherein the difficulty value is further based on the difficulty signals indicating at least one of: requesting remote driving assistance, a number of unprotected turns along each road segment, a portion of a driving area where a field of view of the autonomous vehicle is occluded, or a number of obstacles along each road segment.

24. The system of claim 13, wherein the autonomous vehicle is caused to drive according to the determined route based on the routing signal.

* * * * *